Oct. 10, 1967
M. VERNAY
3,346,119
ROTARY DRUM FILTER
Filed March 30, 1964
2 Sheets-Sheet 1
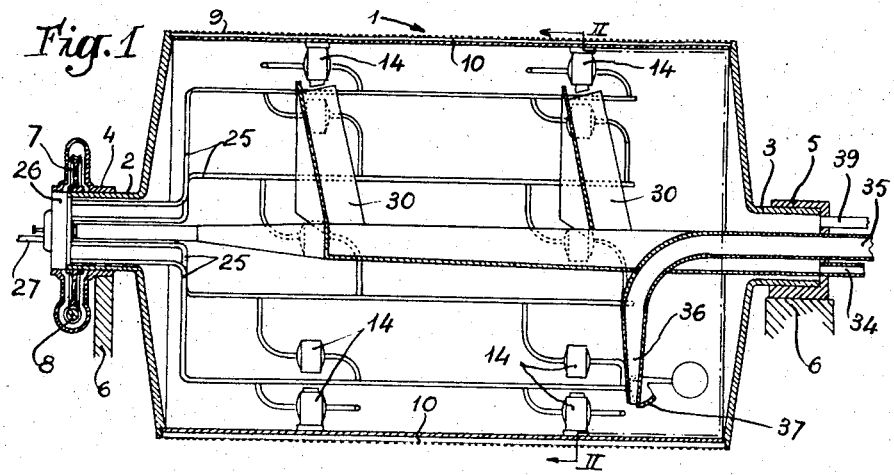
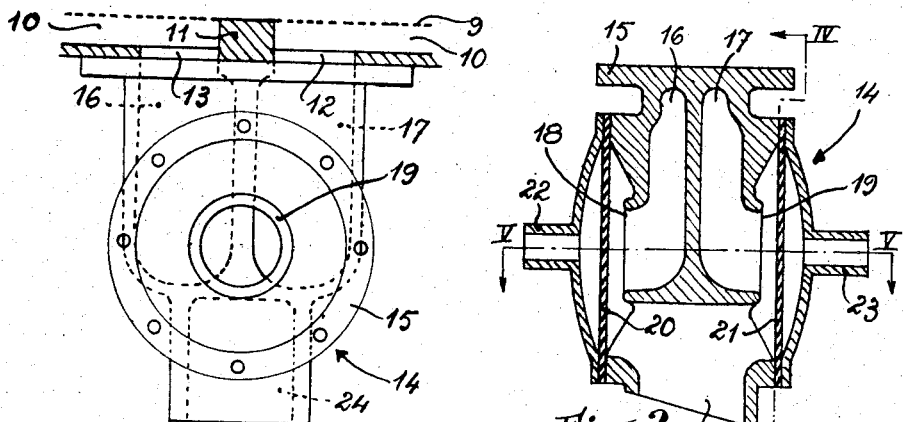
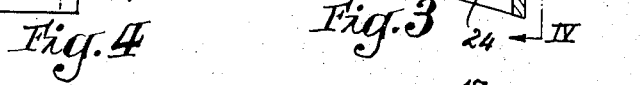
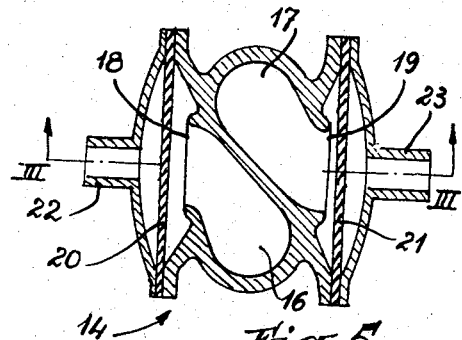
INVENTOR
Marc Vernay
BY Alexander Dowell
ATTORNEYS

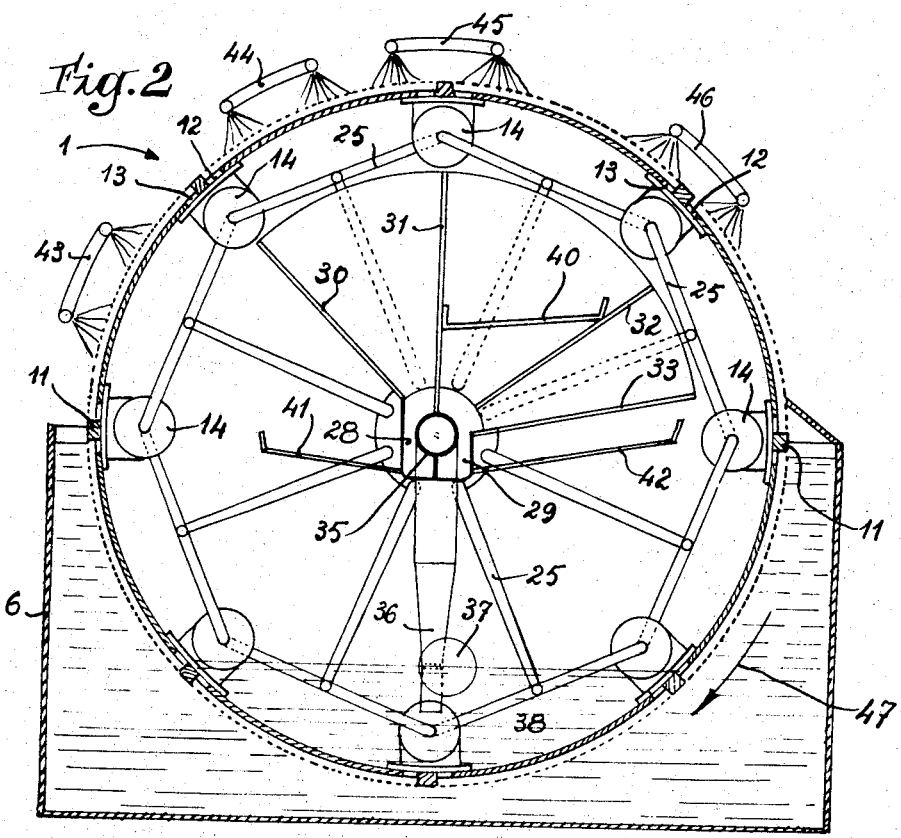

3,346,119
ROTARY DRUM FILTER
Marc Vernay, 19 Rue Louis Ducroize,
Villeurbanne, Rhone, France
Filed Mar. 30, 1964, Ser. No. 355,598
Claims priority, application France, Apr. 8, 1963,
43,530, Patent 1,361,505
2 Claims. (Cl. 210—404)

ABSTRACT OF THE DISCLOSURE

A rotary vacuum filter having peripheral compartments; two series of openings in each compartment; double-valves fixed to the inner face of the drum; each double valve includes two inlet pipes connected to the openings in two adjacent compartments, a single output pipe in free communication with the drum interior and fluid operated diaphragms to control flow between the inlet and outlet pipes; and a plurality of buckets within the drum to receive filtrates of different compositions.

---

This invention relates to rotary drum filters, specially for paper industry.

The rotary drum filters of this kind usually have hollow inner vacuum-compartments in order to collect waters with or without additives, filtered through an outer peripheral cake. The liquid is drained out of the rotary drum through an internal outlet pipe. The time between the water inlet and its dispatching out of the drum is relatively important; in the meantime, the drum has been rotated together with the cake, so that the liquid collected in the outlet pipe is a mixture of waters having different additive percentages. Further, the length of the water-pipes results in a relatively important loss of head.

One object of this invention is to eliminate these disadvantages and to provide a rotary drum filter permitting selective collection of the different filtering waters.

These objects are accomplished in a preferred embodiment of the invention, by mounting distant-actuated valves which may connect the hollow compartments to the inner space of the rotary drum to which vacuum is applied. The liquid delivered by the rotary valves is collected by means of stationary deflectors and buckets located within the rotary drum, outlet means being provided to drain the liquid of each bucket out of the drum.

It will be understood that a rotary drum filter according to the invention eliminates any delay or loss of head, since it comprises no inner pipe of known type. Further, it makes possible to gather independently different liquids corresponding to various fixed orientations on the rotary drum.

In the accompanying drawings:

FIG. 1 is an axial section of a rotary drum filter incorporating the features of the present invention.

FIG. 2 is a section taken on the line II—II (FIG. 1).

FIG. 3 is a section taken through one of the double-valves on line III—III (FIG. 5).

FIGS. 4 and 5 are sections taken respectively on the lines IV—IV and V—V (FIG. 3).

The rotary drum filter illustrated in FIGS. 1 to 5 concerns the paper industry, specially to wash the unbleached paper pulp.

This filter consists of a drum 1 carried by horizontal hollow trunnions 2 and 3 which are rotatably carried by bearings 4 and 5 located on the side wall of a vat 6 wherein the drum 1 is partially immersed. The latter is rotated by means of a pinion 7 rigidly secured to the trunnion 2 and coacting with an endless driving screw 8 (FIG. 1).

The perforated peripheral wall 9 of the drum 1 covers fluid-tight inner compartments or sectors 10 generally referred to as vacuum boxes. Two adjacent sectors 10 are separated by a radial wall 11 extending the whole length of the drum 1.

The internal cylindrical bottom of each sector 10 is provided with two series of openings 12 and 13 (FIG. 2), each of them being located close to one of the radial walls 11. Consequently, any opening 12 of a sector 10 is situated near an opening 13 of the adjacent sector, these openings being both separated only by the thickness of the corresponding radial wall 11.

Within the rotary drum 1 are mounted double-valves 14 as hereinafter described, each of them being connected to a couple of openings 12–13.

Each double-valve 14 has a housing 15 with two parallel inlet pipes 16 and 17 respectively opening on a lateral seat 18 or 19. In front of the latter are mounted resilient cut-off diaphragms 20 and 21. These diaphragms 20–21 are parallel and they may be urged against the valve-seats 18–19 by means of compressed air operating against their opposite sides through canals 22 and 23 (FIGS. 3 to 5).

Each diaphragm 20–21 permits connection of the corresponding inlet pipe 16 or 17 to one single outlet pipe 24 opening through the housing 15.

The double-valves 14 are rigidly secured within the rotary drum 1 so that the inlet pipes 16 and 17 are respectively connected to a couple of openings 13 and 12, the outlet pipe 24 thus being inwardly orientated.

The double-valves 14 are interconnected by compressed air pipes 25 connected to the canals 22 and 23, which makes it possible to independently operate the diaphragms 20–21 on each double valve 14.

The pipes 25 pass through the hollow trunnion 2 and end in a rotary distributor 26 permitting operation of the said valves 14 from outside the drum by the intermediate of one or several stationary canals 27 (FIG. 1). The distributor 26 is of conventional type such as shown in U.S. Patent to Nyman #2,362,300 and per se does not form part of this invention.

In the inner space of the rotary drum 1 are located three stationary buckets 28, 29 and 40 extending throughout its whole axial length (FIGS. 1 and 2). The bucket ends extend through the hollow trunnions 2 and 3 and they are carried by the stationary portions of the bearings 4 and 5. The whole unit 28, 29, 40 is surrounded by stationary deflectors 30, 31, 32, 33 radially orientated and extending up to the outlet opening of the outlet pipes 24 of the double-valves 14. The deflectors 31 and 32 both carry the stationary bucket 40 which is located above the geometric axis of the drum 1, while the buckets 28 and 29 are disposed adjacent to each side of the said geometric axis. At last, radial deflectors 41 and 42 of reduced width are provided under the end-deflectors 30 and 33. There are provided as many deflectors of each type 30, 31, 32 as there are double-valves 14 along one wall 11. In the example shown in FIGS. 1 and 2, it has been supposed that each wall 11 has two double-valves 14. As a result thereof, there are provided two deflectors 30, two deflectors 31, and so on up to 33, the deflectors of the same couple being located in the same drum radial plane.

The stationary buckets 28, 29 and 40 open outside in independent canals 34 extending through the hollow trunnion 3. Within the latter is also situated a canal 35 having its lower end 36 at the lower point within the rotary drum 1. This lower end 36 may be stopped up by means of a floater-valve 37 preventing any dewatering of the filtered water's outlet siphon.

The operation is as follows:

Depressure vacuum is permanently applied to the inner space of the drum 1 by means of an opening 39 in the stationary portion of the bearing 5. By means of the distributor 26, the double-valves 14 are pneumatically- or hydraulically-operated by a simultaneous opening or closing of all the diaphragms 20, 21 corresponding to a related fluid-tight sector 10. By the way, it is possible to open the diaphragm 20 of a double-valve 14 from its seat 18, as shown in FIGS. 3 and 5 while, on the contrary, the diaphragm 21 is maintained applied on its seat 19. It is possible to distant-operate the connection or non-connection of a predetermined fluid-tight sector 10 to the inner space of the drum 1 by means of a compressed fluid through the canals 27. This valve operation is realized automatically by the distributor 26 during the revolution of the drum 1. As a result thereof, it is possible to apply vacuum to a sector 10 at a predetermined position relatively to the stationary vat 6, and to fluid-tightly close it again in another predetermined angular position of the drum 1.

It is then apparent that the operation on each sector 10 may be controlled from outside during the rotation of the drum 1, and more specially the instant where vacuum is applied to a sector 10, thus removing liquid which is immediately discharged towards the inner space of the drum 1 through the wide openings 12 and 13. At the beginning, this filtered liquid is gathered for example at 38, on the bottom of the drum 1; as soon as the outlet pipe 24 of a double-valve 14 moves above the deflectors 30, 31, 32, 33, 41 and 42, the liquid discharged by said outlet pipe 24 is deflected by one of these deflectors and collected in one of the buckets 28, 29 or 40.

The rotary drum filter according to the invention thus permits keeping the sectors 10 permanently empty of water, so that, when they begin to draw liquid, the latter is immediately discharged into the inner space of the drum 1, without delay. It is then possible to collect by means of the pipe 35 and the buckets 28, 29 and 40, four classes of waters having different additive percentages and each corresponding to a predetermined fixed zone of the rotary drum 1.

When using the rotary drum filter of my invention to wash an unbleached cake, the operation is as follows:

Wash spray tubes 43, 44, 45, 46 (FIG. 2) are mounted exteriorly of the drum 1 parallel to its axis. As the drum 1 rotates in the direction of the arrow 47, the liquids collected by the outlet pipe 35 and by the buckets 28, 29, 40 have different compositions, each corresponding to a stationary zone near the spray tubes 43, 44, 45, 46. Each peripheral point of the drum 1 successively circulates through this zone. The liquid gathered in a zone is sent to the wash spray tube of the preceding zone so as to realize a kind of recycling of the washing waters. For example, the wash spray tube 43 is supplied with the liquid gathered in the zone of the tube 44 and collected by the deflectors 28.

Minor changes may be made without departing from the spirit and scope of the invention as claimed. More particularly, the stationary deflectors 30, 31, 32, 33, 41, 42 may be orientable to adapt the composition of the waters drained in the outlet pipe 35 and in the buckets 28, 29 and 40. Further, it is possible to pressurize the external atmosphere above the liquid of the vat 6, instead of applying vacuum to the inner space of the drum 1. At last, the invention may be applied to the realization of endless belt dryers as used in the paper industry.

I claim:

1. In a rotary drum filter, the combination of: a rotary hollow drum having inner peripheral vacuum compartments, each of said compartments being separated from the adjacent compartments by radial walls extending on the whole length of the said drum; two series of openings provided on the internal cylindrical bottom of each compartment, each of said series of openings being located adjacent one of the two radial walls defining each compartment; double-valves fixed on the inner face of said internal cylindrical bottom of said compartments, each double-valve being connected at one end to a couple of openings, one in each of two series of openings located on both sides of said radial walls; the other end of each double valve being connected to a single outlet pipe which in turn is in free communication with the interior of said drum, compressed air pipes connected at one end to the said double-valves inside the rotary drum and, on the other end, to a rotary distributor located outside the drum, in alignment with a hollow trunnion carrying the said rotary drum; each of said double-valves comprising means responsive to compressed air supplied thru said compressed air pipes to control communication between the couple of openings at said one end and said single outlet pipe; vacuum means connected to the interior of the filter; single outlet pipes for said double valves in free communication with said interior; and a plurality of bucket means and outlets therefor constructed and arranged to receive effluent from the valves in different angular locations thereof whereby to allow selection of filtrates of different compositions.

2. A rotary drum filter as claimed in claim 1, wherein each of said double-valves has two inlet pipes independently connected to adjacent fluid-tight compartments of the said drum, and each controlled by a seat-and-diaphragm obturator connecting them to a common outlet pipe opening in the inner space of the said rotary drum, the said diaphragms being independently operated by means of compressed air.

References Cited
UNITED STATES PATENTS

| | | | |
|---|---|---|---|
| 2,167,159 | 7/1939 | Oliver | 210—404 X |
| 2,362,300 | 11/1944 | Nyman | 210—395 X |
| 2,998,883 | 9/1961 | Rich | 210—404 |
| 3,220,554 | 11/1965 | Burchert et al. | 210—395 X |

SAMIH N. ZAHARNA, *Primary Examiner.*